T861026

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 368

714,056

LAMINATE OF ORIENTED FILMS OF OLEFIN POLYMERS CONTAINING AZIDO BRIDGING AGENTS

John N. Hall, Brookside Park, Newark, Del., assignor to Hercules Incorporated, Wilmington, Del., a corporation of Delaware

Filed Mar. 18, 1968. Published Apr. 8, 1969
Class 161—252
No Drawing. 8 Pages Specification

Biaxially oriented films of crystalline olefin polymers, such as high density polyethylene, stereoregular polypropylene, poly(1-butene), poly(1-pentene), etc., can be plied and subjected to pressures of from 50 to 2000 p.s.i. at temperatures within the range of from about 30° C. to 5° C. below the crystalline melting point of the polymer, to prepare thick, transparent (i.e. greater than 1/16 inch) laminates of high strength, stiffness, and impact resistance. In some cases it may be desirable to use an olefin polymer which has been bridged by heating with from about 0.02% to 0.075%, by weight, of an azido bridging agent. The resulting laminate can be used for impact resistant and shatter-proof window panes which are relatively bullet-proof to low caliber bullets.